(12) United States Patent
Rojey

(10) Patent No.: US 8,536,233 B2
(45) Date of Patent: Sep. 17, 2013

(54) METHOD OF PRODUCING SYNTHETIC GAS WITH PARTIAL OXIDATION AND STEAM REFORMING

(75) Inventor: Alexandre Rojey, Rueil Mailmaison (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 453 days.

(21) Appl. No.: 12/376,701

(22) PCT Filed: Jul. 6, 2007

(86) PCT No.: PCT/FR2007/001166
§ 371 (c)(1),
(2), (4) Date: Aug. 16, 2010

(87) PCT Pub. No.: WO2008/017741
PCT Pub. Date: Feb. 14, 2008

(65) Prior Publication Data
US 2010/0298449 A1   Nov. 25, 2010

(30) Foreign Application Priority Data
Aug. 8, 2006  (FR) ...................................... 06 07276

(51) Int. Cl.
*C10G 2/00*  (2006.01)
(52) U.S. Cl.
USPC ........................................................ 518/700
(58) Field of Classification Search
USPC ........................................................ 518/700
See application file for complete search history.

(56) References Cited

U.S. PATENT DOCUMENTS

| | | | |
|---|---|---|---|
| 5,763,716 A | 6/1998 | Benham et al. | |
| 6,277,894 B1 | 8/2001 | Agee et al. | |
| 2004/0181313 A1 | 9/2004 | Mohedas et al. | |

FOREIGN PATENT DOCUMENTS

| | | | |
|---|---|---|---|
| EP | 0152652 A1 | | 8/1985 |
| EP | 1219566 A1 | * | 7/2002 |
| WO | 9315999 A1 | | 8/1993 |
| WO | 9955618 A1 | | 11/1999 |
| WO | 2008017741 R | | 12/2007 |

OTHER PUBLICATIONS

Hamelinck, Carlo et al, "Production of FT Transportation Fuels from Biomass; Technical Options, Process Analysis and Optimisation, and Development Potential." Energy 29 (2004): 1743-1771. XP-002461506.

* cited by examiner

*Primary Examiner* — Yong Chu
(74) *Attorney, Agent, or Firm* — Millen, White, Zelano & Branigan, P.C.

(57) ABSTRACT

Process for producing liquid hydrocarbons from a heavy feedstock such as biomass, carbon, lignite, or heavy petroleum residue comprising:
A partial oxidation b) of the heavy feedstock, producing a synthesis gas SG1, with an H2/CO ratio<1; A steam reforming c) of a light feedstock that comprises hydrocarbons having at most 4 carbon atoms, for the production of a synthesis gas SG2 with an H2/CO ratio>3; A Fischer-Tropsch conversion into liquid hydrocarbons of a synthesis gas SG, mixture of at least a portion of SG1 and at least a portion of SG2, in proportions such that SG has an H2/CO ratio of between 1.2 and 2.5. The light feedstock comprises hydrocarbons having less than 10 carbon atoms C1-C10 are obtained from a pretreatment of the heavy feedstock and/or are produced in the Fischer-Tropsch stage and/or during a downstream hydrocracking stage.

11 Claims, 5 Drawing Sheets

METHOD OF PRODUCING SYNTHETIC GAS WITH PARTIAL OXIDATION AND STEAM REFORMING

FIELD OF THE INVENTION

The object of the invention is a process for producing synthesis gas from heavy carbon-containing material such as carbon or lignite, heavy petroleum residues, or biomass, in particular wood or vegetable scraps. The synthesis gas that is obtained makes it possible to produce paraffinic or olefinic hydrocarbons, which are bases of high-quality liquid fuels (diesel fraction with a high cetane number, kerosene, etc. . . . ) or petrochemical bases, in particular by means of a Fischer-Tropsch synthesis stage. It can also be used to produce oxidized compounds, for example methanol or dimethyl ether.

PRIOR ART

Several processes for producing synthesis gas from carbon-containing materials, in particular steam reforming, partial oxidation and the autothermal process, are already known.

Steam reforming (known under the set of initials SMR, which comes from the English "steam methane reforming," which means "reforming of methane with steam") consists in making the feedstock, typically a natural gas or light hydrocarbons, react on a catalyst in the presence of steam to obtain a synthesis gas that primarily contains, not including water vapor, a mixture of carbon oxide and hydrogen. This operation is endothermic. It is carried out typically by making the feedstock that is diluted with steam circulate in tubes that are filled with catalyst (in general a nickel catalyst, for example comprising 6 to 25% by weight of nickel deposited on a substrate that primarily comprises alumina or a mixture of alumina and one or more other refractory compounds). The tubes are typically heated by radiation in tubular furnaces. This process is well suited to gaseous feedstocks, in particular to natural gas, but it is incompatible with heavy carbon-containing feedstocks that contain impurities such as carbon, petroleum residues or biomass (wood or other ligno-cellulosic compounds, vegetable scraps, ...).

Partial oxidation, or gasification by partial oxidation (known under the set of initials POX that comes from the English "partial oxidation,") consists in forming by combustion under sub-stoichiometric conditions a mixture at high temperature, in general between 1000° C. and 1600° C., of carbon-containing material, on the one hand, and air or oxygen, on the other hand, to oxidize the carbon-containing material and to obtain a synthesis gas. When a synthesis gas without nitrogen is sought, this process uses oxygen, produced by air distillation according to conventional techniques. The POX is compatible with all forms of carbon-containing feedstocks, including heavy feedstocks.

The autothermal process (known under the set of initials ATR that comes from the English "autothermal reformer,") which carries out a partial oxidation that is immediately followed by a catalytic steam reforming under adiabatic conditions at high temperature, for example in the output temperature range: 900° C. - 1000° C. This process implements a serial combination of the two preceding reaction methods. It consumes less oxygen than the POX process, but it requires a catalytic bed. Like steam reforming, it is usable only with light feedstocks and is not compatible with heavy carbon-containing materials such as carbon, petroleum residues or biomass of the wood or vegetable scraps type.

Other technical elements relative to the processes of steam reforming, partial oxidation and autothermal process can be found in the reference work A: "Conversion Processes", P. Leprince, Technip Editions, 2001, Paris 15$^{th}$, pages 455-495.

Finally, the sole known process for producing synthesis gas that is well suited to heavy carbon-containing materials that are typically loaded with heteroatoms, such as metals (Ni, V) and/or N, O, S, is partial oxidation, or POX. This POX process, typically carried out with oxygen and under pressure, makes it possible to easily produce synthesis gases that are suitable for the desired downstream syntheses.

The desired H2/CO ratio can vary according to the desired synthesis and/or the catalyst that is used. This ratio is different, for example, depending on whether an iron catalyst is used, or alternately a cobalt catalyst is used during the synthesis of waxes for the production of diesel bases.

The Fischer-Tropsch conversion stage of the synthesis gas can be carried out according to any of the known processes, with a catalyst that is suitable for the H2/CO ratio of the synthesis gas that is produced, for example a cobalt catalyst for a synthesis gas with an H2/CO ratio of between about 1.8 and 2.5 or else an iron catalyst for a synthesis gas with an H2/CO ratio of between about 1.2 and 2. It will be possible in particular to use a three-phase fixed-bed reactor or a three-phase reactor in suspension (in "slurry" according to the English name), i.e., a three-phase reactor with a liquid phase that comprises a solid catalyst that is divided in suspension and a gaseous phase (synthesis gas). A preferred option according to the invention corresponds to such a three-phase reactor in suspension that comprises a Fischer-Tropsch catalyst in the form of fine particles comprising an inert substrate that is impregnated with iron or preferably cobalt. It will be possible, for example, to use a substrate made of alumina or silica, or zirconia, or silica-alumina, or alumina-zirconia, impregnated by 10% to 30% by weight of iron or cobalt relative to the entire catalyst. The catalyst can comprise particles with a mean diameter of between 3 and 150 micrometers, preferably 10 to 120 micrometers, in suspension in a liquid that essentially consists of products of the reaction, in particular paraffinic waxes that are melted to the reaction temperature. The percentage by weight of catalyst can be encompassed in general between 10% and 40% by weight relative to the liquid/solid catalyst suspension. The gas surface speed in the reactor can be between 0.05 m/s and 0.4 m/s, in particular between 0.12 and 0.3 m/s. This pressure is often between 1.5 and 4 MPa, in particular between 1.8 and 2.8 MPa. The temperature is often between 215° C. and 255° C., in general between 230° C. and 240° C. It will be possible, in particular for more details relating to Fischer-Tropsch catalysts and/or processes, to refer to patents or patent applications: EP 450 860; U.S. Pat. Nos. 5,961,933; 6,060,524; 6,921,778; PCT/FR05/02.863.

The highest-performing Fischer-Tropsch synthesis processes typically use catalysts based on cobalt and require an H2/CO ratio in the synthesis gas that is close to 2, on the order of 2.15. This type of process maximizes the production of long-chain hydrocarbons in the form of waxes, while minimizing the production of light effluents. The thus obtained waxes are then sent to a hydrocracking unit that makes it possible to transform them into liquid fuels, diesel fuel and kerosene. The invention is not, however, linked to a process or to a catalyst, or to particular operating conditions for the Fischer-Tropsch synthesis.

Downstream from the Fischer-Tropsch synthesis unit, a hydrocracking (HDK) of at least a portion or all of the fractions that boil above 150° C. is carried out in general to obtain high-quality kerosene and gas oil. The lightest fractions of the feedstock are hydroisomerized during this stage. The hydrocracking is a well-known process, described in the above-mentioned reference work A, pages 334-364.

From heavy feedstocks, the POX-type processes make it possible to produce only synthesis gases whose composition is characterized by an H2/CO ratio that is much less than 2, typically on the order of 1, and in general less than 1.

As a means for adjusting the H2/CO ratio, the prior art discloses resorting to a stage for converting CO by shift conversion, which operates according to the reaction: CO+H2O→CO2+H2.

This stage makes it possible to reduce the number of CO moles and to increase the number of hydrogen moles that are present in the mixture. However, this transformation of CO into CO2 reduces the quantity of CO that can be converted into hydrocarbons, in particular into liquid hydrocarbons.

It is desirable to improve the performance levels of the POX process, applied to heavy carbon-containing materials from the standpoint of overall energy efficiency so as to better upgrade these heavy carbon-containing materials by increasing the "carbon yield," i.e., the quantity of synthesis gas that can be produced from a given quantity of heavy carbon-containing material. It is also important to find a new energy system that upgrades these carbon-containing materials that discharges less CO2 into the atmosphere.

It is also important to obtain products that can be upgraded under better conditions. From this viewpoint, it is necessary to maximize the production of diesel fuel and kerosene by minimizing the production of light hydrocarbons and in particular liquefied petroleum gas (LPG), whose upgrading is more difficult than that of liquid fuels.

The object of the process according to the invention is a process that corresponds to at least one or even to all of these objectives.

The invention also makes it possible to achieve this object with a reliable and simple installation that can benefit from an intense thermal integration, which does not add complexity or a lack of reliability to a POX gasification of heavy carbon-containing materials that is inherently a difficult technology.

SUMMARY DEFINITION OF THE INVENTION

To achieve the above-mentioned objects, the process according to the invention uses, in combination with an operation of partial oxidation with oxygen of the heavy carbon-containing material, a steam reforming operation, making it possible to obtain a synthesis gas that is characterized by an H2/CO ratio that is much higher than 2, for example close to 3 or even greater than 3.

The combination of a steam reforming operation with a partial oxidation operation is known in the prior art when the feedstock from which the synthesis gas is produced is formed by natural gas or light hydrocarbons. However, a steam reforming unit cannot operate with a heavy feedstock such as a solid phase that is formed by carbon or biomass or even with an optionally liquid feedstock that is formed by heavy hydrocarbons, such as, for example, a petroleum vacuum residue.

According to the invention, a steam reforming unit that operates with a relatively light feedstock, such as, for example, a natural gas, is combined with a partial oxidation unit that operates with a heavy feedstock by adjusting the respective quantities of synthesis gas that is produced by these two units so as to obtain the desired H2/CO ratio.

According to one of the preferred variants of the invention, a light fraction that is obtained by a pretreatment of the initial feedstock is used as a feedstock for the steam reforming unit.

Thus, for example, it is possible to obtain a gaseous fraction by pyrolysis of a ligno-cellulosic biomass feedstock, and this gaseous fraction can be used at least partially, after purification, as a feedstock for the steam reforming unit.

It was also discovered that as an alternative and/or complementary feedstock for the steam reforming unit, it is possible to use at least a portion of the light fractions that have less than 10 carbon atoms, in particular 1 to 4 carbon atoms (C1-C4) that are co-produced in the Fischer-Tropsch conversion unit of the synthesis gas and/or in the downstream hydrocracking unit that is typically used for the conversion of heavy fractions (in particular waxes and middle distillates) that are produced during the conversion of the synthesis gas.

It was finally discovered that it is possible to use the additional production of synthesis gas by steam reforming, simultaneously for the adjustment of the H2/CO ratio and for the production of hydrogen that is intended for the above-mentioned hydrocracking stage.

DETAILED DESCRIPTION OF THE INVENTION

To achieve these objects, a process is thus proposed for producing liquid hydrocarbons from primarily an overall feedstock that comprises one or more heavy feedstocks from the group that is formed by the biomass, carbon, lignite, and petroleum residues that boil essentially above 340° C., whereby this process comprises at least:

A stage b) for partial oxidation of said heavy feedstock in the presence of oxygen, for the production of a first synthesis gas SG1, optionally purified, with an H2/CO ratio that is less than 1;

A stage c) for steam reforming a light feedstock that comprises in particular hydrocarbons that have less than 10 carbon atoms for the production of a second synthesis gas SG2, optionally purified, with an H2/CO ratio of greater than 3;

A stage d) for Fischer-Tropsch conversion into hydrocarbons of a synthesis gas SG that is formed by the mixture, generally purified before stage d), of at least a portion of SG1 and at least a portion of SG2, in proportions such that SG has an H2/CO ratio of between 1.2 and 2.5, An optional stage e) for hydrocracking at least a portion of the hydrocarbons that are produced in stage d), boiling above 150° C., in which the light feedstock of stage c) contains recycled hydrocarbons that have less than 10 carbon atoms, originating from a pretreatment of at least one of said heavy feedstocks upstream from stage b), and/or effluents from stage d) of Fischer-Tropsch conversion, and/or effluents from stage e) for hydrocracking if the latter is implemented.

Thus, the combination of a heavy feedstock that is subjected to the partial oxidation: POX and a light vapor reformed steam reformed feedstock makes it possible to obtain an improved H2/CO ratio that is adequate for the conversion of the synthesis gas. For this light feedstock, recycled light hydrocarbons that are obtained from a pretreatment of the heavy feedstock are advantageously used, which upgrades these light hydrocarbons and increases the typically inadequate H2/CO ratio of the synthesis gas that is produced from the single heavy feedstock.

According to a first variant of the process, the light feedstock also comprises natural gas (i.e., external natural gas, obtained from (a) gas well(s) or else gas combined with petroleum, whereby these gases are typically treated in advance to eliminate in particular the sulfur-containing compounds).

According to another variant of the process, the light feedstock can also comprise recycled hydrocarbons that have less than 10 carbon atoms that are produced during a stage a) for cracking or pyrolysis of at least one of the heavy feedstocks upstream from stage b). It may involve a preliminary cracking of petroleum residues, or a pyrolysis of solid feedstocks such as carbon and/or lignocellulosic biomass. The term cracking is applied to feedstocks that may be liquid, at a suitable temperature, whereas the term pyrolysis is applied to solid feedstocks. In the two cases, it is a partial cracking of heavy compounds in the absence of oxygen.

In particular, the heavy feedstock can comprise (typically at least 40%, or at least 50% by weight) of the biomass, in particular ligno-cellulosic biomass (wood and vegetable scraps), and it is possible to carry out a stage a) for pyrolysis of this biomass in the absence of oxygen under a temperature of between 300° C. and 650° C., to separate from the effluent of stage a) a relatively heavy stream that is sent to stage b) and a relatively light stream that is sent to stage c), typically after purification.

In particular for stage c) for steam reforming, it is possible to achieve a preliminary purification with elimination of heavy fractions (for example boiling above 150° C.), typically sent to the POX, and desulfurization of the light fraction that is sent to the steam reforming. Typically, the sulfur-containing compounds that are present are eliminated by hydrotreatment of the relatively light stream (often the gaseous fraction and/or the light hydrocarbons of less than 10 carbon atoms of the pyrolysis effluent), for example with a cobalt/molybdenum catalyst on alumina, then elimination of the H2S that is formed.

An analogous treatment is typically carried out on SG2, or else on SG so as to send to the stage d) for conversion of hydrocarbons a purified synthesis gas that is virtually free of sulfur-containing and nitrogen-containing compounds.

The purification treatment or treatments can be more or less strict according to the heavy feedstocks that are used and/or the Fischer-Tropsch catalyst that is used. Before carrying out the Fischer-Tropsch synthesis, it is sometimes necessary to eliminate virtually totally, for example up to a residual content of less than 0.1 ppmv, the sulfur-containing and nitrogen-containing compounds from the synthesis gas that is obtained (in particular with a Fischer-Tropsch cobalt catalyst). Suitable purification treatments are described in particular in the general reference work A that is cited above on pages 480-491 and 575-593.

The separation of the H2S and the CO2 is conventionally carried out by scrubbing the gas by an aqueous amine solution, for example monoethanolamine (MEA) or methyldiethanolamine (MDEA) as described in the above-mentioned general reference work A, pages 468-471, or in the reference work B: "Gas Purification" $2^{nd}$ Edition, F. C. Riesenfeld, and A: L. Kohl Gulf Publishing Company; Houston. (Purification of Gases), pages 22 to 81.

One option that is sometimes used consists in carrying out in advance on the synthesis gas, after condensation of water, a conversion of sulfur-containing compounds into H2S, in particular on a chromium catalyst on alumina or on a copper/chromium catalyst on alumina as described in pages 626-627 in the general reference work B. It is also possible to use a shift conversion catalyst based on iron oxide and chromium oxide as described in this work, page 634. A final treatment on activated carbon as described in this work, page 633, can finally be used downstream from the scrubbing with amines to remove the residual traces of impurities.

It is also possible, if an extreme purity of the synthesis gas is desired, to use—in place of scrubbing with amines—a purification with scrubbing with cooled methanol, for example according to the Rectisol process that uses two stages for the elimination of COS and H2S, then CO2, as described in the above-mentioned general reference work A, pages 488 and 489, and in the above-mentioned general reference work B, pages 691 to 700. Other options that use molecular sieves (adsorption with pressure balance, called PSA, or a catalytic conversion on zinc oxide) can also be used during the purification of the synthesis gas.

The purification that is carried out can typically eliminate almost all of the impurities, for example, to less than 0.1 ppmv of sulfur and likewise for the nitrogen-containing compounds such as HCN.

It is also possible to increase the H2/CO ratio of the synthesis gas SG1, or SG2, or SG, by sending a fraction of this gas to a CO conversion stage to form vapor according to the balanced reaction CO=H2O=H2+CO2. A fraction of the synthesis gas, for example SG2, can also be used for the necessary production of hydrogen, in particular hydrogen for hydrocracking.

The variant of the process according to the invention with preliminary pyrolysis of the biomass makes it possible not to send to stage b) of the POX the entire biomass but only a limited fraction and to duly upgrade by steam reforming the light fractions that are produced during the pyrolysis pretreatment, in a way that is useful for obtaining a suitable H2/CO ratio for SG. Different pyrolysis treatments can be carried out, indicated in particular in the reference work: "*Les biocarburants*. Etat des lieux. Perspectives et enjeux du developpement [*The Biofuels*. State of Matters. Development Perspectives and Issues]," D. Ballerini; FPI Publications, Technip Editions; Paris, 2006, pages 201 to 219. The following are differentiated in particular:

The pyrogasification with high heating speed (>100° C./s) and high temperature (>800° C.), which maximizes the gas production.

The rapid pyrolysis ("flash" in English) with high heating speed (>100° C./s), and low temperature (for example, 500° C.), which maximizes the oil production.

The slow pyrolysis, with low heating speed (<50° C./minute) and low temperature (for example, 500° C.), which maximizes the carbon-containing solid phase production.

It is also known to carry out a hydrothermal treatment in the presence of pressurized water vapor.

By manipulating the operating conditions, it therefore is possible to adjust the quantity of gas that is produced.

Gas can finally also be produced by fermentation of certain types of biomass.

According to another variant of the process, the light feedstock comprises hydrocarbons that have less than 5 carbon atoms (C1-C4), produced during stage d) for conversion of the synthesis gas SG. This makes it possible to upgrade the unconverted residual gas that typically comprises light hydrocarbons of C1-C4 in a useful way for obtaining a suitable H2/CO ratio for SG.

According to another variant of the process, a stage e) for hydrocracking at least most of the hydrocarbons that boil above 340° C. and that are produced in stage d) is carried out, and the light feedstock comprises hydrocarbons that have less than 5 carbon atoms, produced during the hydrocracking stage e). This also makes it possible to upgrade the light hydrocracking fractions, which typically comprise light hydrocarbons of C1-C4, in a way that is useful for obtaining a suitable H2/CO ratio for SG.

It is also possible to advantageously carry out the hydrocracking stage e) in the presence of hydrogen that is produced from SG1 and/or SG2 and/or SG. The techniques for producing hydrogen from synthesis gas are conventional, and it is possible, for example, to carry out a shift conversion and purification by adsorption with pressure variation (a technique that is known under the name of PSA).

The H2/CO ratio that is desired for SG is most often close to 2 or even 2.15 when a Fischer-Tropsch cobalt catalyst is used. It optionally is possible, if a suitable H2/CO ratio is not perfectly achieved, to add to SG a small quantity of hydrogen, produced from a portion of SG1 and/or SG2, representing less than 10 mol % of SG to carry out a final adjustment of the H2/CO ratio. This offers an element of flexibility in the respective quantities and the use of heavy and light feedstocks.

DESCRIPTION OF THE FIGURES

The invention will be better understood from reading the accompanying figures.

Figure 1:
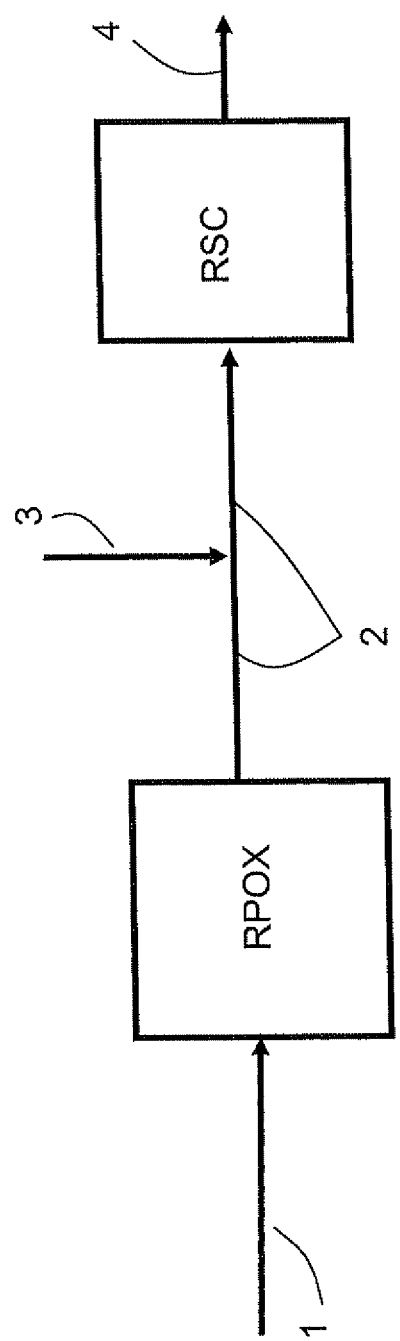
FIG. 1 diagrammatically shows an installation for implementing a process according to the prior art.

In the installation of FIG. 1 according to the prior art, the heavy feedstock, for example the biomass in the form of fragments of 1 to 10 mm in length, in particular 2 to 6 mm in length, or sprayed carbon, or a petroleum residue, as well as the oxygen that is necessary for the partial oxidation of this heavy feedstock enter via the pipe 1 into the partial oxidation reactor RPOX. Often, the oxygen and the feedstock are supplied separately and not by a single pipe. The synthesis gas that is produced exits via the pipe 2. Steam is added via the pipe 3, and the mixture that results enters into the shift conversion reactor RSC, in which a suitable fraction of the CO that is present is converted into CO2 with the formation of hydrogen, so that the final H2/CO ratio of the synthesis gas is close to 2.15. This synthesis gas that exits via the pipe 4 is then sent to a downstream unit, not shown, for its catalytic conversion into primarily liquid hydrocarbons and/or in the form of wax. In general, the CO2 that is present in the synthesis gas is eliminated, for example by conventional scrubbing of the gas by an aqueous solution of ethanolamines before the conversion of the synthesis gas into hydrocarbons.

The addition of the shift conversion stage to the POX stage exhibits the drawback of reducing the carbon yield and consequently the production capacity of liquid fuels from a given feedstock quantity. Actually, the moles of CO that are converted into CO2 are no longer available to supply the synthesis gas conversion unit. In addition, the conversion from CO to CO2 increases the discharge of CO2, gas with a greenhouse effect.

Figure 2:
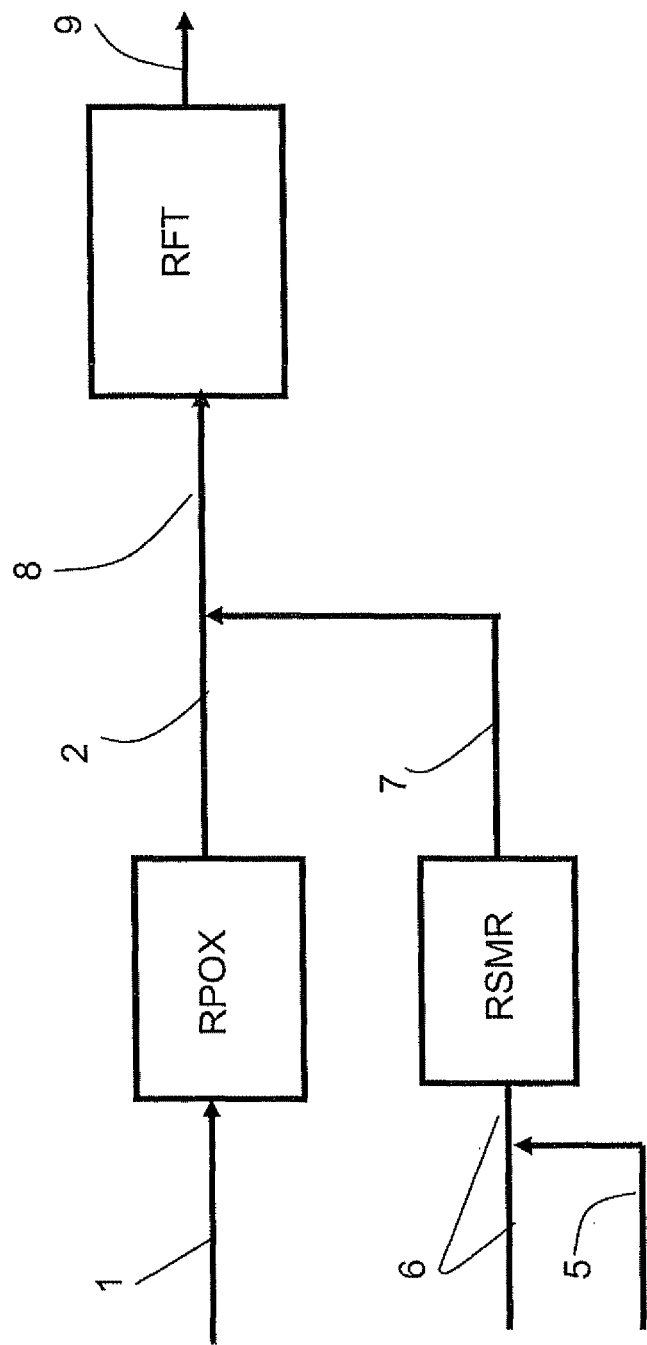
FIG. 2 diagrammatically shows an installation for implementing a process according to the invention.

In the installation of FIG. 2, for the implementation of the process according to the invention, the heavy feedstock (biomass and/or sprayed carbon and/or petroleum residue) is supplied with the oxygen that is necessary for the partial oxidation via the pipe 1 (or often by two separate pipes, not shown) in the reactor for partial oxidation RPOX, from where the synthesis gas that is produced exits via the pipe 2. The light feedstock is supplied via the pipe 6 into the steam reforming reactor RSMR after the addition of steam that comes in via the pipe 5. The synthesis gas that is produced exits from the reactor RSMR via the pipe 7, whereby the ratio of flow rates coming in via the pipes 2 and 7 is adjusted so as to obtain, after mixing, a synthesis gas whose H2/CO ratio has the desired value, for example 2.15. The synthesis gas in a thus obtained mixture is sent via the pipe 8 to the reactor RFT for catalytic conversion into primarily liquid hydrocarbons or in the form of waxes, from where the reaction products exit via the pipe 9. In general, the CO2 that is present in the synthesis gas is eliminated upstream from the conversion reactor of the synthesis gas into hydrocarbons, for example by conventional scrubbing of the gas by an aqueous ethanolamine solution. The light feedstock comprises recycled hydrocarbons with less than 10 carbon atoms, which, after transformation into synthesis gas, increase the H2/CO ratio of the heavy feedstock. It can also comprise natural gas (external feedstock).

Figure 3:
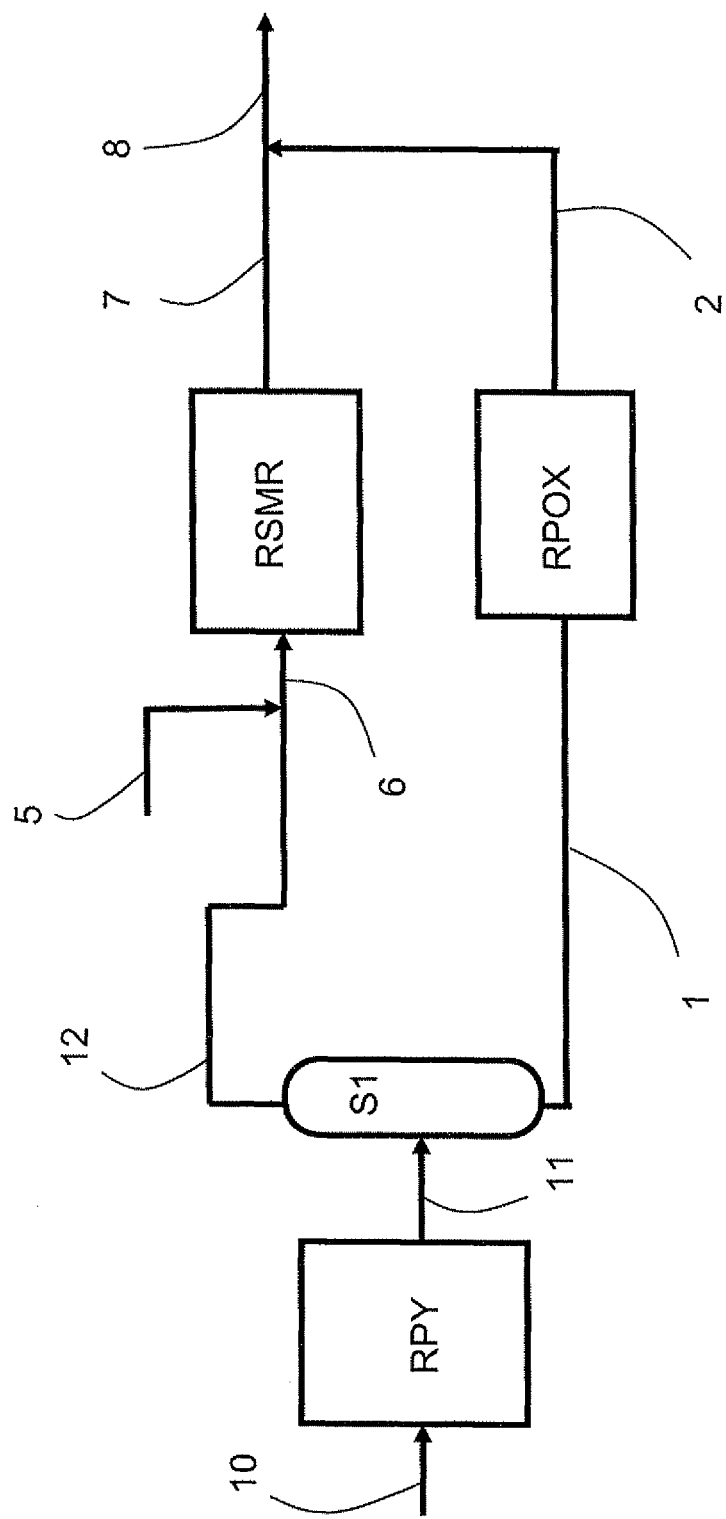
FIG. 3 diagrammatically shows an installation for implementing a process according to the invention in which the light feedstock is obtained, at least partially, by pretreatment of the heavy feedstock, upstream from the POX stage.

In the installation of FIG. 3 for the implementation of the process according to the invention, the initial feedstock, in particular the biomass in the form of fragments with dimensions that are essentially between 1 and 10 mm, in particular between 2 and 6 mm, is first of all treated in a pyrolysis reactor RPY. This thermal pyrolysis treatment is typically carried out without oxygen, or with a low oxygen content. It is carried out at a temperature of generally between 300° C. and 650° C., preferably between 400° C. and 600° C., under a pressure typically of between 0.1 and 10 MPa, preferably between 0.1 and 4 MPa. The dwell time is adapted to the temperature that is used and typically can vary between 0.1 and 400 seconds, preferably between 0.3 and 100 seconds. The heat input that is necessary to the pyrolysis can be produced by indirect heating with heating surfaces (for example a rotary kiln) and/or by contact with hot gases, for example gases for combustion with air or oxygen of a portion of the products that are recovered downstream (for example a portion of the liquid fraction). The biomass returns to the pyrolysis reactor RPY via the pipe 10. At the outlet of this reactor, after cooling to a temperature of between 20° C. and 65° C., a mixture that typically consists of a gaseous fraction, a liquid fraction, and a residual solid fraction is obtained in the pipe 11. The gaseous fraction is separated in the separator S1 (for example by gravity) from the heavier fractions (liquid and solid) and sent via the pipes 12 then 6 to the steam reforming reactor RSMR, after purification, addition of water, and optionally addition of an external feedstock such as the purified natural gas via the pipe 5. The means for compression of the gas that is sent to the steam reforming and pretreatment of this gas upstream from the steam reforming are conventional and are not shown in the figure. Actually, most often, a treatment for eliminating all of the sulfur-containing products is carried out by scrubbing with amines and/or with soda, in general with a preliminary hydrodesulfurization of the gas (pressurized treatment of hydrogen for converting the sulfur of the organic products into H2S) with a Co/Mo on alumina-type or Ni/Mo on alumina-type hydrodesulfurization catalyst.

The solid and liquid fractions that are separated in S1 are sent in a mixture with the liquid fraction via the pipe 1 to the partial oxidation reactor RPOX. The synthesis gases (gases that are high in CO and H2) that exit from the RSMR and RPOX reactors respectively via the pipes 7 and 2 are mixed in the pipe 8 so as to obtain an H2/CO ratio that is close to 2.15 so as to be able to supply downstream a unit for Fischer- Tropsch conversion to the cobalt catalyst, typically after a purification by scrubbing with methanol that is cooled according to the Rectisol process, then passage on an activated-carbon fixed bed to eliminate essentially totally the possible traces of sulfur-containing products, nitrogen-containing products, and other possible impurities. The recycling of the light compounds of pyrolysis in the steam reforming reactor RSMR makes it possible to increase the H2/CO ratio and therefore to reduce the natural external gas input or else to reduce the conversion of the CO to the vapor that is necessary to obtain the final H2/CO ratio.

Figure 4:
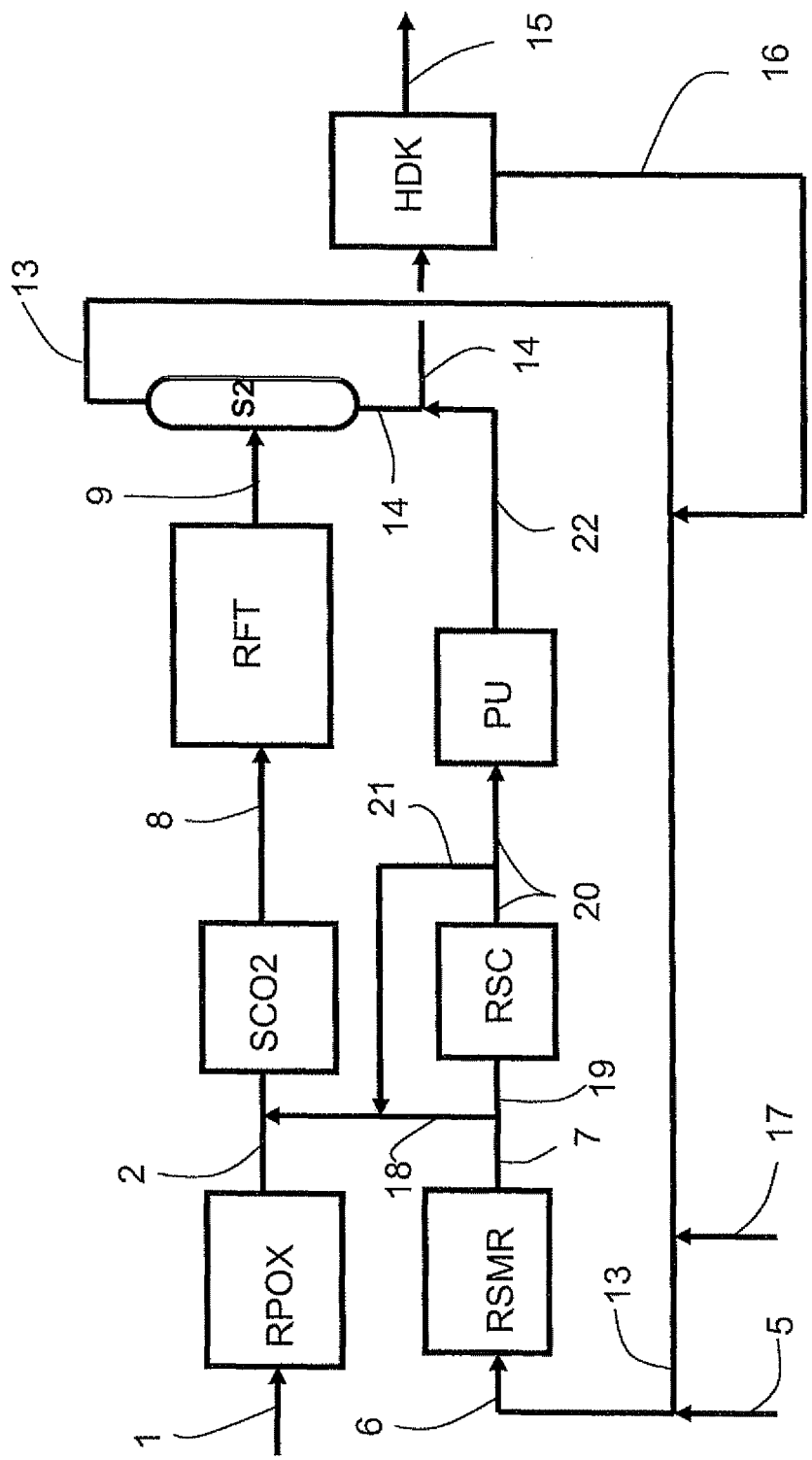
FIG. 4 diagrammatically shows an installation for implementing a process according to the invention in which the light feedstock consists of, or comprises, at least a portion of the light fraction of the effluents of the stage for converting synthesis gas into hydrocarbons.

In the installation of FIG. 4 for the implementation of the process according to the invention, the initial heavy feedstock (coal, lignite, biomass, petroleum residue) supplies via the pipe 1 the partial oxidation reactor RPOX to produce a synthesis gas that is evacuated via the pipe 2. This synthesis gas is mixed with another synthesis gas that is produced by vapor steam reforming, coming in via the pipe 18. The mixture of the two synthesis gases is purified in an SCO2 unit to eliminate the CO2, then in a unit for desulfurization and elimination of sulfur-containing and nitrogen-containing impurities, before supplying a Fischer-Tropsch conversion reactor RFT primarily with liquid hydrocarbons and waxes, using, for example, a cobalt catalyst in three-phase suspension. The effluent from this synthesis gas conversion reactor is evacuated via the pipe 9 and separated in the separator S2. The unconverted synthesis gas, enriched with light fractions, in particular with C1-C4 (with 1 to 4 carbon atoms), co-produced during the Fischer-Tropsch conversion of the synthesis gas, as well as the naphtha that is obtained (fraction that ranges from C5 up to a boiling point of 150° C.) are sent via the lines 13 then 6 to the steam reforming reactor RSMR. The middle distillates and the waxes (in molten form) are sent via the pipe 14 to a hydrocracking unit HDK (also carrying out a hydroisomerization of middle distillates) to produce in particular high-quality middle distillates (gas oil, kerosene) that are evacuated via the pipe 15.

The steam reforming reactor RSMR also receives, in general, a light feedstock that comes in via the pipe 17, for example purified (desulfurized) natural gas. It is also advantageous to add to it a light fraction that comes in via the pipe 16 that is taken at the outlet of the hydrocracking unit HDK, in particular the C1-C4 hydrocracking fractions and the hydrocracking naphtha that are effectively upgraded. According to the invention, the fractions that are lighter than the highly desired products (kerosene and gas oil), fractions that are co-produced during the conversion of the synthesis gas and during hydrocracking, are therefore upgraded very effectively.

The major portion of the steam reforming effluent reaches the partial oxidation effluents via the pipe 18. However, a portion of the steam reforming effluent is sent via the pipe 19 to an RSC (SHIFT) reactor for conversion of the CO to $CO_2$ and $H_2$, then via the pipe 20 to a unit PU for purification of hydrogen, for example by adsorption with pressure variation (known under the name PSA). This thus makes it possible to produce the hydrogen that is necessary to the hydrocracking unit HDK, which is evacuated via the line 22.

A hydrogen-rich fraction optionally can be sent via the pipe 21 to the synthesis gas that is used for the synthesis of hydrocarbons to adjust its H2/CO ratio close to about 2.15. By increasing the quantity of thus recycled hydrogen, it is possible to reduce the quantity of necessary steam reforming synthesis gas, and therefore the overall quantity of external light fraction that has to be sent to the steam reforming reactor RSMR.

Figure 5:
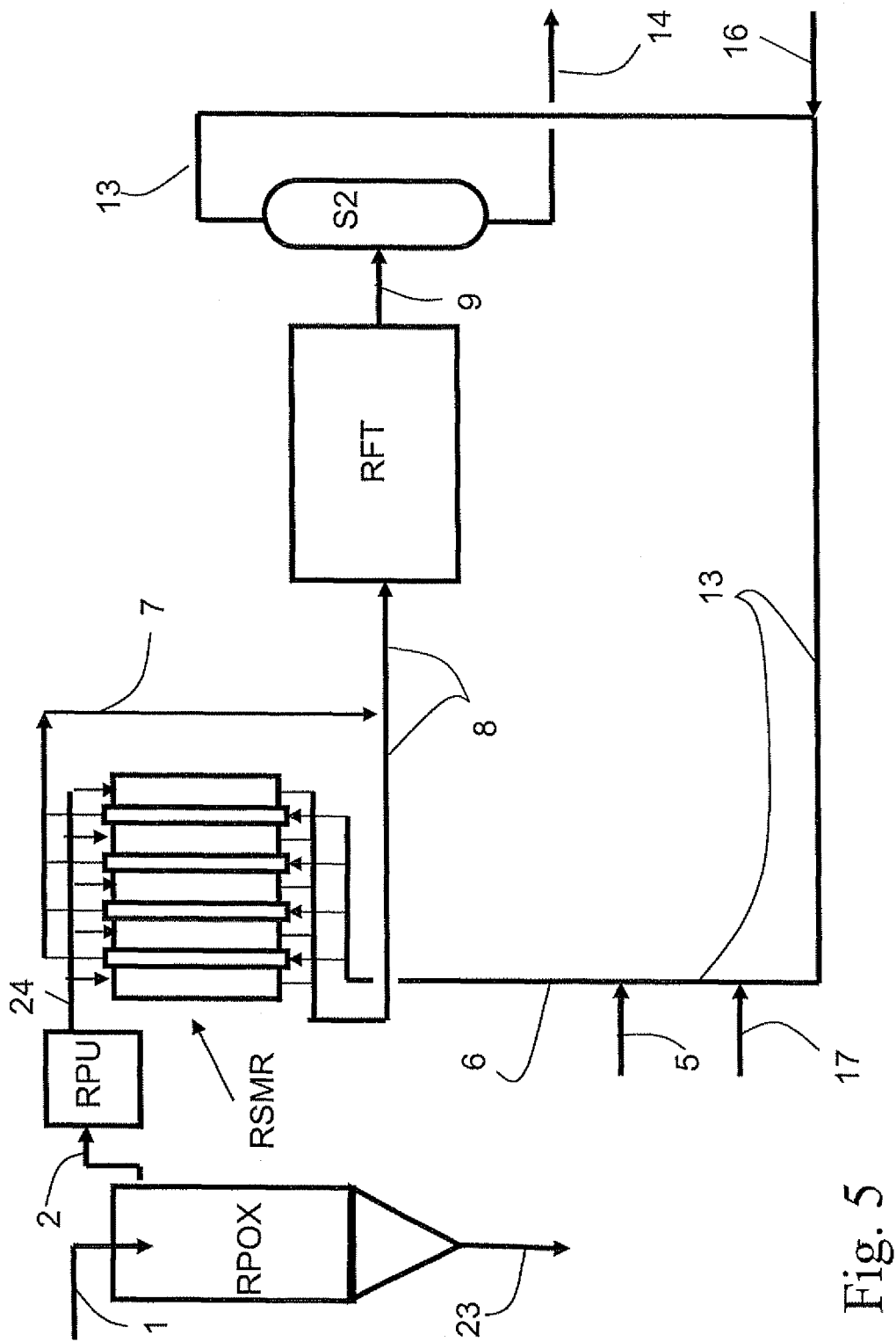
FIG. 5 diagrammatically shows an installation for implementing a process according to the invention that comprises an intensive thermal integration.

The steam reforming stage operating endothermically, at least a portion of the heat that is necessary to the steam reforming can be obtained by a recovery of heat in the hot gases exiting from the partial oxidation reactor RPOX, as is illustrated in the diagrammatic installation of FIG. 5, for implementing the process according to the invention.

The heavy feedstock comes into the reactor RPOX via the pipe 1. The molten ashes (non-gasifiable compounds such as minerals and/or metal traces contained in the feedstock) are evacuated via the pipe 23. The hot gases that exit from the reactor RPOX are sent via the pipe 2 to a purification stage in the reactor RPU, which can be carried out by, for example, an additional partial oxidation stage that is carried out at high temperature by adding a light fraction and oxygen, not shown, so as to eliminate the tars by re-gasification. The light fraction, for example hydrocarbons that have less than 10 carbon atoms, can be recycled from the outlet of the synthesis unit RFT and/or a hydrocracking unit HDK, not shown. It can also comprise or consist of natural gas, which assists in the gasification by hydrogen input. The hot gases exit from the reactor RPU via the pipe 24 and then pass into the calender of the steam reforming reactor RSMR. In this case, RSMR is typically a heat reactor-exchanger. The light feedstock that comes into this reactor RSMR via the pipes 13 then 6 circulates in tubes filled with catalyst (in general a nickel catalyst), and the thus produced synthesis gas exits via the pipe 7. The light feedstock that comes into the reactor RSMR via the pipe 6 is typically formed by a light hydrocarbon fraction that is obtained from the synthesis unit RFT and the separator S2 and, circulating in the pipe 14, it is formed by an optional input of light feedstock that is recycled from the hydrocracking unit, and, circulating in the pipe 16, it is formed by steam coming in via the pipe 5 and an optional input of light feedstock coming in from the outside via the pipe 17, in the form of, for example, natural gas.

EXAMPLE 1

According to the Invention

A unit for producing synthesis gas for implementing the process according to the invention treats wood chips. Wood in the form of small chips (for example between 2 and 6 mm), having a moisture level of 40% by weight, is first dried, for example in a drier with a conveyor belt or else a fluidized bed. After drying, the wood flow rate is 18,160 kg/h, including 16,160 kg/h of dry material and 2,000 kg/h of residual moisture. The wood is stored in a pressurized vessel, for example between 3 and 3.2 MPa, then sent directly to the partial oxidation reactor RPOX, also supplied by 10,590 kg/h of oxygen and 2,000 kg/h of additional water vapor steam, also used for the transport of wood to the reactor. The effluent at the outlet of the reactor RPOX is a synthesis gas with an H2/CO ratio such that H2/CO=0.67 with a gaseous flow rate of 30,590 kg/h, a temperature of 1400° C., and under a pressure of 2.9 MPa. 160 kg/h of solid products, essentially carbon-poor ashes, also exits from RPOX. The gas is cooled (quenched) with water then subjected to a partial conversion of the CO with steam in a reactor RSC1 (steam conversion reaction: CO+H2O=CO2+H2) to increase the H2/CO ratio of this first synthesis gas, which passes to 1.34.

Furthermore, a steam reforming of recycled fractions (defined below) is carried out in a reactor RSMR, and then a partial conversion of the CO with the vapor from this effluent is carried out in a reactor RSC2 to obtain a second synthesis gas with an H2/CO ratio =13.7. The total synthesis gas obtained from the mixing of the first and second synthesis gases, with an H2/CO ratio=2.15, is well suited to a Fischer-Tropsch synthesis on a cobalt catalyst, which is carried out in, for example, a three-phase suspension-type reactor.

The Fischer-Tropsch distillates with a boiling point of greater than that of naphtha (more than 150° C.) and the Fischer-Tropsch waxes are hydrocracked (HDK unit carrying out a hydrocracking and a hydroisomerization).

As a recycled feedstock for the steam reforming reactor RSMR, a fraction of the top gases contained in the effluents of the Fischer-Tropsch unit is used: CO, H2, CO2, H2O (residual), C1-C4, as well as the C1-C4 top gases contained in the effluents of the hydrocracking unit, as well as the naphthas that are produced by the Fischer-Tropsch unit and by the hydrocracking unit.

The additional Fischer-Tropsch top gas is used as a combustible gas for the steam reforming reactor RSMR.

The results that correspond to these units are provided in Tables 1, 2 and 3 below.

TABLE 1

|  | RPOX FEEDSTOCK | RPOX EFFLUENT | Quenching on the RPOX Effluent | RSC1 Feedstock | RSC1 Effluent |
|---|---|---|---|---|---|
| Biomass: |  |  |  |  |  |
| Dry Material kg/h | 16,160 |  |  |  |  |
| H2O Moisture kg/h | 2,000 |  |  |  |  |
| Oxygen | 10,590 |  |  |  |  |
| H2O kg/h | 2,000 |  | 6,973 |  |  |
| Pressure MPa |  | 3 |  |  |  |
| Temperature ° C. |  | 1,400 | 25 | 300 | 358 |
| Flow Rate kg/h (Gas) |  | 30,590 |  | 37,563 | 37,563 |
| H2 % by Vol. |  | 21.4 |  | 16.8 | 23.8 |
| CO % by Vol. |  | 32 |  | 25.2 | 17.7 |
| H2O % by Vol. |  | 32.6 |  | 47 | 40.5 |
| CO2 % by Vol. |  | 14 |  | 11 | 18 |
| C1 % by Vol. |  | 0 |  | 0 | 0 |
| H2/CO Vol. |  | 0.67 |  | 0.67 | 1.34 |
| Ashes kg/h |  | 160 |  |  |  |

TABLE 2

|  | RSMR FEEDSTOCK | RSMR EFFLUENT | RSC2 Feedstock | RSC2 Effluent |
|---|---|---|---|---|
| C1 (External Feedstock) | 0 |  |  |  |
| Residual CO/H2/CO2/H2O from the FT Top Gas kg/h (Partial Recycling; Supplement: Fuel) | 948 |  |  |  |
| FT C1-C4 kg/h (Partial Recycling; Supplement: Fuel) | 408 |  |  |  |
| FT Naphtha (C5-150° C.) kg/h (Recycling) | 881 |  |  |  |
| HDK C1-C4 kg/h (Recycling) | 42 |  |  |  |
| HDK Naphtha (C5-150° C.) kg/h (Recycling) | 327 |  |  |  |
| H2O kg/h | 7,341 |  |  |  |
| PRESSURE MPA |  | 2.6 |  |  |
| Temperature ° C. |  | 850 | 380 | 448 |
| Flow Rate kg/h | 9,947 | 9,947 | 9,947 | 9,947 |
| H2 % by Vol. |  | 40.2 | 40.2 | 46.6 |
| CO % by Vol. |  | 9.8 | 9.8 | 3.4 |
| H2O % by Vol. |  | 39.8 | 39.8 | 33.4 |
| CO2 % by Vol. |  | 8.2 | 8.2 | 14.6 |
| C1 % by Vol. |  | 2 | 2 | 2 |
| H2/CO Vol. |  | 4.1 | 4.1 | 13.7 |

TABLE 3

|  | RFT FEEDSTOCK | RFT EFFLUENT | HDK Feedstock | HDK Effluent |
|---|---|---|---|---|
| Pressure MPa |  | 2.0 |  | 5 |
| Temperature ° C. |  | 50 |  | 50 |
| Flow Rate kg/h | 13,468 | 13,468 | 2,620.2 | 2.620.2 |
| H2 % by Vol. | 64.6 |  |  |  |
| CO % by Vol. | 30 |  |  |  |
| H2/CO | 2.15 |  |  |  |
| Residual CO/H2/CO2/H2O from the RFT Effluents Top Gas kg/h |  | 2,961 |  |  |
| H2 kg/h (HDK) |  |  | 5.2 |  |
| C1-C4 kg/H (Effluent Top Gas) |  | 1,275 |  | 41.7 |
| Naphtha kg/h |  | 881 |  | 326.9 |
| Distillates + Waxes kg/h |  | 2,615 | 2,615 |  |
| Kerosene + Gas Oil kg/h |  |  |  | 2,251.6 |

It is seen that the recycling of light products: a fraction of CO, H2, CO2, H2O and C1-C4 of the Fischer-Tropsch top gases, and all of the C1 to C4 hydrocracking and naphthas of the Fischer-Tropsch and HDK (hydrocracking) units makes it possible to obtain a second synthesis gas, which, mixed with the first, obtained from the partial oxidation of the biomass, makes it possible to achieve an H2/CO ratio of 2.15 that is perfectly suitable to a Fischer-Tropsch synthesis on a cobalt catalyst. The recycling does not involve the middle distillates, with a temperature of more than 150° C., desired high-quality products. The latter are produced with a yield of 13.9% relative to the quantity of dry material of the treated biomass.

In the process according to the prior art without steam reforming, to obtain the same H2/CO ratio, a much more intensive conversion of the CO to the partial oxidation effluent should have been carried out to reach 2.15 and not 1.34. This would have had the result of the disappearance of a significant quantity of CO, and a correlative loss to the final quantity of middle distillates that are produced (kerosene+gas oil).

EXAMPLE 2

According to the Invention

The same partial oxidation of biomass as in Example 1 is carried out but, contrary to Example 1, the steam reforming feedstock is increased by means of a suitable quantity of external methane so as to obtain the H2/CO ratio of 2.15 by mixing the two synthesis gases without carrying out the conversion of CO. The results are presented in Tables 4, 5 and 6.

TABLE 4

|  | RPOX FEED-STOCK | RPOX EFFLU-ENT | Quenching on the RPOX EFFLUENT |
|---|---|---|---|
| Biomass: Dry Material kg/h | 16,160 | | |
| H2O Moisture kg/h | 2,000 | | |
| Oxygen | 10,590 | | |
| H2O kg/h | 2,000 | | 6,973 |
| Pressure MPa | | 3 | |
| Temperature ° C. | | 1,400 | 25 |
| Flow Rate kg/h (Gas) | | 30,590 | |
| H2 % by Vol. | | 21.4 | |
| CO % by Vol. | | 32 | |
| H2O % by Vol. | | 32.6 | |
| CO2 % by Vol. | | 14 | |
| C1 % by Vol. | | 0 | |
| H2/CO Vol. | | 0.67 | |
| Ashes kg/h | | 160 | |

TABLE 5

|  | RSMR FEED-STOCK | RSMR EFFLU-ENT | SMR Fuel |
|---|---|---|---|
| C1 (External Feedstock) | 4,248 | | 714 |
| CO/H2/CO2/H2O (Residual) of the Top Gas Effluents kg/h; Ex FT top gas kg/h (Fuel) | 0 | | 3,684 |
| Ex FT C1-C4 kg/H (Fuel) | 0 | | 2,907 |
| Ex FT Naphtha kg/h (Recycling) | 1,674 | | |
| Ex HDK C1-C4 kg/h (Recycling) | 80 | | |
| Ex HDK Naphtha kg/h (Recycling) | 625 | | |
| H2O kg/h | 28,042 | | |
| PRESSURE MPA | | 2.6 | |
| Temperature ° C. | | 850 | |
| Flow Rate kg/h | 34,669 | 34,669 | |
| H2 % by Vol. | | 43.8 | |
| CO % by Vol. | | 8.1 | |
| H2O % by Vol. | | 39.7 | |

TABLE 5-continued

|  | RSMR FEED-STOCK | RSMR EFFLU-ENT | SMR Fuel |
|---|---|---|---|
| CO2 % by Vol. | | 6.2 | |
| C1 % by Vol. | | 2.2 | |
| H2/CO Vol. | | 5.4 | |

TABLE 6

|  | RFT FEED-STOCK | RFT EFFLU-ENT | HDK Feed-stock | HDK Efflu-ent |
|---|---|---|---|---|
| Pressure MPa | 2.0 | | 5 | |
| Temperature ° C. | 50 | | 50 | |
| Flow Rate kg/h | 24,217 | 24,217 | 5,012 | 5,012 |
| H2 % by Vol. | 65 | | | |
| CO % by Vol. | 30.6 | | | |
| H2/CO | 2.15 | | | |
| CO/H2/CO2/H2O (Residual) from the RFT Top Gas kg/h | | 3,684 | | |
| H2 kg/h | | | 10 | |
| C1-C4 kg/H | | 2,907 | | 80 |
| Naphtha kg/h | | 1,674 | | 625 |
| Distillates + Waxes kg/h | | 5,002 | 5,002 | |
| Kerosene + Gas Oil kg/h | | | | 4,307 |

The yield that is obtained in desired high-quality products (kerosene and gas oil) is 20.4% relative to the total quantity of treated material: dry material of the biomass+quantity of external methane (fuel+SMR). This shows the advantage of using steam reforming of a recycled and/or external light feedstock that makes it possible to limit or, even better, to eliminate the conversion of CO into CO₂ and hydrogen, conventionally used intensively with hydrogen-poor heavy feedstocks.

The process according to the invention, which advantageously recycles relatively less desired light fractions than kerosene and gas oil, is not linked to a particular process or to a particular reactor technology for partial oxidation or steam reforming or conversion of CO into CO₂ and H₂, or hydrocracking, or purification, or pyrolysis, or with particular operating conditions of corresponding stages, but it is based on the complementary arrangement of the described process stages. These elementary stages are typically conventional and known to one skilled in the art.

The invention claimed is:
1. An integrated process for producing liquid fuel from primarily an overall feedstock that comprises one or more heavy feedstocks from at least one of biomass, coal, lignite, and petroleum residues that boil essentially above 340° C., said process comprising:
   A stage a) for cracking or pyrolysis of least one of said heavy feedstocks,
   A stage b) for partial oxidation of effluents from stage a) in the presence of oxygen, for the production of a first synthesis gas SG1, optionally purified, with an H2/CO ratio that is less than 1;
   A stage c) for steam reforming a light feedstock of hydrocarbons consisting of hydrocarbons that have less than 10 carbon atoms per molecule from a stream produced during stage (a) and effluents from a hydrocracking stage (e) and optionally from stage (d) of a Fischer-Tropsch conversion, for the production of a second synthesis gas SG2 with an H2/CO ratio of greater than 3;
   wherein said stage d) comprises said Fischer-Tropsch conversion into hydrocarbons of a synthesis gas SG that is formed by a mixture, generally purified before stage d), of at least a portion of SG1 and at least a portion of SG2, in proportions such that SG has an H2/CO ratio of between 1.2 and 2.5, and wherein said stage e) comprises said hydrocracking of at least a portion of the hydrocarbons produced in stage d), boiling above 150° C. to transform said hydrocarbons into said liquid fuel, whereby said process is conducted without the need of an external source of a light feedstock.

2. A process according to claim 1, in which wherein said light feedstock comprises hydrocarbons that have less than 10 carbon atoms that are contained in the effluents of stage d) for Fischer-Tropsch conversion.

3. A process according to claim 1, in which the heavy feedstock comprises biomass, and in which a stage a) for pyrolysis of this biomass is carried out without oxygen under a temperature of between 300° C. and 650° C.; the effluent of stage a) is separated into a relatively heavy stream that is sent to stage b) and a relatively light stream that is sent to stage c), after purification.

4. A process according to claim 1, wherein said light feedstock of hydrocarbons having less than 5 carbon atoms, are produced during stage d) for Fischer-Tropsch conversion of the synthesis gas SG.

5. A process according to claim 1, in which a stage e) comprises hydrocracking at least the largest portion of hydrocarbons boiling above 340° C. produced in stage d), and said light feedstock comprises hydrocarbons having less than 5 carbon atoms, produced during the hydrocracking stage e).

6. A process according to claim 5, in which stage e) for hydrocracking is carried out in the presence of hydrogen that is produced from SG1 and/or SG2 and/or SG.

7. A process according to claim 1, in which a small quantity of hydrogen, produced from a portion of SG1 and/or SG2, representing less than 10 mol% of SG, is added to SG to carry out a final adjustment of the H2/CO ratio.

8. A process according to claim 1, wherein the feedstock comprises biomass and stage (a) comprises pyrolysis of a fraction of the biomass.

9. A process according to claim 1, wherein the light feedstock of hydrocarbons consisting of hydrocarbons having less than 10 carbons per molecule comprises said stream produced during stage (a).

10. A process according to claim 1, wherein the light feedstock of hydrocarbons consisting of hydrocarbons having less than 10 carbons per molecule comprises said effluents from said hydrocracking stage.

11. An integrated process for producing liquid fuel from primarily an overall feedstock that comprises one or more heavy feedstocks from at least one of biomass, coal, lignite, and petroleum residues that boil essentially above 340° C., said process consisting of:

A stage a) for cracking or pyrolysis of at least one of said heavy feedstocks,

A stage b) for partial oxidation of effluents from stage a) in the presence of oxygen, for the production of a first synthesis gas SG1, optionally purified, with an H2/CO ratio that is less than 1;

A stage c) for steam reforming a light feedstock of hydrocarbons consisting of hydrocarbons that have less than 10 carbon atoms per molecule from a stream produced during stage (a) and effluents from a hydrocracking stage (e) and optionally from stage (d) of a Fischer-Tropsch conversion, for the production of a second synthesis gas SG2, optionally purified, with an H2/CO ratio of greater than 3;

wherein said stage d) comprises said Fischer-Tropsch conversion into hydrocarbons of a synthesis gas SG that is formed by a mixture, generally purified before stage d), of at least a portion of SG1 and at least a portion of SG2, in proportions such that SG has an H2/CO ratio of between 1.2 and 2.5, and wherein said stage e) comprises said hydrocracking of at least a portion of the hydrocarbons produced in stage d), boiling above 150° C. to transform said hydrocarbons into said liquid fuel, whereby said process is conducted without an external source of a light feedstock.

\* \* \* \* \*

UNITED STATES PATENT AND TRADEMARK OFFICE
CERTIFICATE OF CORRECTION

PATENT NO.         : 8,536,233 B2                                            Page 1 of 1
APPLICATION NO.    : 12/376701
DATED              : September 17, 2013
INVENTOR(S)        : Alexandre Rojey It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1122 days.

Signed and Sealed this

Fifteenth Day of September, 2015

Michelle K. Lee
*Director of the United States Patent and Trademark Office*